United States Patent Office 3,083,135
Patented Mar. 26, 1963

3,083,135
PHOSPHORUS-CONTAINING THIOUREAS
Glenn R. Price, South Chicago Heights, and Edward N. Walsh, Chicago Heights, Ill., and James T. Hallett, Saratoga, Calif., assignors to Stauffer Chemical Company, New York, N.Y., a corporation of Delaware
No Drawing. Filed June 15, 1962, Ser. No. 202,685
10 Claims. (Cl. 167—22)

This invention relates to a new class of thioureas in which one of the nitrogen atoms of the thiourea group is substituted with a phosphoro ester group and the second nitrogen atom is substituted with at least one hydroxyl alkyl or phenyl-substituted hydroxyalkyl group, a process for preparing said thioureas, and their method of use as pest controlling agents.

The compounds of the present invention have the general formula

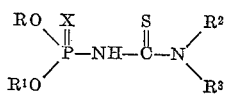

wherein R and $R^1$ are lower-alkyl, X is selected from the group consisting of sulfur and oxygen, $R^2$ is selected from the group consisting of hydroxyalkyl and phenyl-substituted hydroxyalkyl radicals, and $R^3$ is selected from the group consisting of hydrogen, lower-alkyl, aryl, and $R^2$ as previously defined. Suitable lower-alkyl radicals for R, $R^1$, and $R^3$ include methyl, ethyl, propyl, isopropyl, amyl, octyl, and the like. The hydroxyalkyl and phenyl-substituted hydroxyalkyl radicals of $R^2$ include such members as methanol, ethanol, 1-propanol, 2-propanol, 2-methyl-1-propanol, 2-ethyl-2-propanol, 2-octanol, 2-hydroxy-2-phenyl-ethyl-1, etc. The aryl radicals represented by $R^3$ are monocyclic radicals and substituted monocyclic radicals such as phenyl, halo and alkoxy-substituted phenyls. Examples of the aryl radicals include 4-chlorophenyl, 2,4-dichlorophenyl, 4-alkoxyphenyl, 4-bromophenyl, and 2-chloro-4-methoxyphenyl.

The compounds of the present invention may be prepared according to the following general reaction:

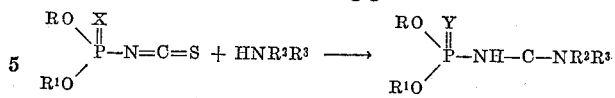

wherein R, $R^1$, $R^2$, $R^3$, and X are as defined hereinbefore. The products of the reaction are viscous oils or solids. Stoichiometric ratios of reactants are normally used and yields are generally quantitative. In the preferred method of reaction, an organic solvent or water is preferably used to solubilize or disperse the reactants. Among suitable organic solvents are acetone, hexane, benzene, ethanol, and the like. The reaction proceeds rather rapidly at temperatures even as low as $-50°$ C. or lower, and the product is stable at fairly high temperatures, at least as high as $100°$ C. Nevertheless, a preferred temperature range within which the highest product yields are obtained is between about $0°$ C. and $50°$ C.

Although the compounds of the present invention show pesticidal activity generally, their miticidal activity, especially with the two-spotted mite, *Tetranychus telarius*, is unexpectedly high. This is due to the presence of the hydroxyl group in the thioureau portion of the molecule. The closely related phosphorus-containing thioureas (some of which has been known heretofore) lacking the hydroxyl group have, if any, a low degree of pesticidal activity and, almost invariably no activity at all with regard to mites. To illustrate the foregoing, the thiourea compounds disclosed in German Patent No. 952,712, issued November 22, 1956, in which one nitrogen is substituted with a phosphorothio ester group and the second nitrogen is linked to hydrogen, alkyl, phenyl, alkoxyphenyl, and the like, are found to be virtually ineffective as pesticides and/or miticides. The miticidal activity of compounds of the present invention is compared with the activity of some closely related phosphorus-containing thioureas in Table I wherein the percentage kill among the pest species is reported for a percentage concentration of the candidate compound in aqueous dispersion. A slanted line is used to separate the percentage kill, shown in the left, from the percentage concentration shown on the right.

TABLE I

| | Post Embryonic: Percent Mortality/ Percent Conc. | Eggs: Percent Mortality/Percent Conc. |
|---|---|---|
| Related hydroxyl-free compounds: | | |
| $(C_2H_5)_2P(O)-NH-CS-NH_2$ | 0/0.25 | 0/0.25 |
| $(CH_3O)_2P(S)-NH-CS-N(C_2H_5)_2$ | 0/0.1 | 0/0.1 |
| $(C_2H_5O)_2P(S)-NH-CS-N(C_2H_5)_2$ | 0/0.1 | 0/0.1 |
| $(C_2H_5O)_2P(O)-NH-CS-N(C_2H_5)_2$ | 0/0.1 | 0/0.1 |
| Compounds of the Invention: | | |
| $(CH_3O)_2P(S)-NH-CS-N(CH_3)(C_2H_4OH)$ | 100/0.001 | 0/0.001 |
| $(CH_3O)_2P(S)-NH-CS-N(C_2H_5)(C_2H_4OH)$ | 80/0.0005 | 60/0.0005 |
| $(CH_3O)_2P(S)-NH-CS-N(C_3H_7)(C_2H_4OH)$ | 50/0.005 | 0/0.005 |
| $(C_2H_5O)_2P(O)-NH-CS-N(C_6H_5)(C_2H_4OH)$ | 90/0.1 | 100/0.1 |
| $(CH_3O)_2P(S)-NH-CS-N(C_2H_4OH)_2$ | 100/0.1 | 100/0.1 |

In testing for miticidal activity, young pinto bean plants in the primary leaf stage were used as host plants for the mites. Bean plants were infested with several hundred mites and then sprayed to run-off with an aqueous test dispersion prepared as described hereinafter. Sprayed plants were transferred to a greenhouse and held for fourteen days. Miticidal and ovicidal activity of the test compounds were determined after seven and fourteen days.

The following examples illustrate the principles of the invention and include the best modes presently known for use in practice of these principles.

Example 1

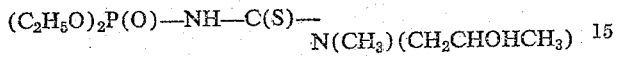
$(C_2H_5O)_2P(O)$—NH—C(S)—N(CH$_3$)(CH$_2$CHOHCH$_3$)

To a solution of 19.5 grams (0.10 mole) of O,O-diethylphosphoroisothiocyanatidate in 159 ml. of acetone was added a solution of 8.9 grams (0.10 mole) of 2-methylamino propanol-2 in 50 ml. of acetone over a thirty minute period at room temperature. The reaction mixture was allowed to stir at room temperature for another hour, the solvent removed, and the product concentrated to 60° C. at 1.0 mm. of Hg pressure to yield 27.5 grams (97%) of N-(O,O-diethylphosphoryl)-N' - (methyl) - N' - (2-hydroxypropyl-1) thiourea analyzing as 10.9% P as compared to 10.8% P theoretical.

Example 2

$(C_2H_5O)_2P(S)$—NH—C(S)—N(C$_2$H$_5$)(C$_2$H$_4$OH)

To a mixture of 17.8 grams (0.20 mole) of 2-ethylamino ethanol in 59 ml. of hexane was added 42.0 grams (0.20 mole) of O,O-diethylphosphoroisothiocyanato thionate in 50 ml. of hexane over a 50 minute period at 0° C. The reaction product, N-(O,O-diethylphosphorothiono)-N'-(ethyl)-N'-(β-hydroxyethyl) thiourea, separated as a white solid in near quantitative yield. Recrystallization from a benzene-hexane mixture gave the pure product as a white solid, M.P. 59° C., analyzing as 10.1% P and 21.2% S as compared to 10.2% P and 21.3% S, theoretical.

Example 3

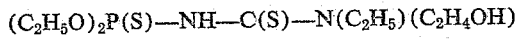
$(C_2H_5O)_2P(O)$—NH—C(S)—N(C$_2$H$_5$)(CH$_2$CHOHC$_6$H$_5$)

To a solution of 19.5 grams (0.10 mole) of O,O-diethylphosphoroisothiocyanatidate in 159 ml. of acetone was added a solution of 16.5 grams (0.10 mole) of 1-phenyl-2-ethylamino ethanol in 50 ml. of acetone over a 30 minute period at 30° C. The reaction mixture was stirred for 30 more minutes at room temperature, the solvent removed by heating to 55° C. and the product concentrated to 60° C. at 1.5 mm. of Hg pressure to yield 36.0 grams (100%) of N-(O,O-diethylphosphoryl)-N'-(ethyl)-N'-(2-phenyl-2-hydroxyethyl) thiourea analyzing as 8.8% P as compared to 8.6% P theoretical.

Example 4

$(CH_3O)_2P(S)$—NH—C(S)—N(C$_2$H$_5$)(CH$_2$CH$_2$OH)

To a solution of 18.2 grams (0.10 mole) of O,O-dimethylphosphoroisothiocyanato thionate in 100 ml. of benzene was added a solution of 8.9 grams (0.10 mole) of N-ethyl ethanolamine over a 15 minute period at room temperature. The reaction mixture was allowed to warm to 35° C. during the addition and was stirred for an additional hour after the addition was complete. After removing the solvent under partial pressure the product was concentrated to 50° C. at 1.0 mm. of Hg pressure to yield 27.0 grams (93% of theoretical yield) of N-(O,O-dimethylphosphorothiono) - N' - (ethyl)-N'-(β-hydroxyethyl) thiourea analyzing as 11.2% P and 22.5% S, as compared to 11.4% P and 22.8% S theoretical.

Example 5

$(i-C_3H_7O)_2P(S)$—NH—C(S)—NH(CH$_2$CH$_2$OH)

To a solution of 35.9 grams (0.15 mole) of diisopropylphosphoroisothiocyanato thionate in 100 ml. of benzene was added 9.2 grams (0.15 mole) of ethanolamine at 15° C. over a 20 minute period. The product separated as an oil which was washed with benzene and hexane and then concentrated to 50° C. at 1.0 mm. of Hg pressure to yield 24.5 grams (65% of theoretical yield) of N-(O,O - diisopropylphosphorothiono)-N'-(β-hydroxyethyl) thiourea, analyzing as 10.4% P and 21.5% S, as compared to 10.3% P and 21.3% S theoretical.

Using a procedure substantially in accordance with one or more of those described in the foregoing examples, the following specific compounds were prepared.

Example 6

$(C_2H_5O)_2P(O)$—NH—C(S)—N(C$_2$H$_5$))CH$_2$CH$_2$OH)

N-(O,O-diethylphosphoryl) - N' - (ethyl) - N' - (β-hydroxyethyl) - thiourea; percent yield=97.0%; found: 10.8% P and 11.1% S; theory: 10.9% P and 11.3% S.

Example 7

$(C_2H_5O)_2P(S)$—NHC(S)—NHCH$_2$CH$_2$OH

N-(O,O - diethylphosphorothiono) - N' - (β-hydroxyethyl) thiourea; percent yield=87.0; found: 11.2% P and 22.8% S; theory: 11.0% P and 23.4% S.

Example 8

$(C_2H_5O)_2P(O)$—NHC(S)—NHCH$_2$CH$_2$OH

N-(O,O-diethylphosphoryl)-N'-(β - hydroxyethyl) thiourea; percent yield=82.0; found: 11.7% P and 12.0% S; theory: 12.1% P and 12.5% S.

Example 9

$C_2H_5O)_2P(S)$—NHC(S)—N(C$_2$H$_4$OH)$_2$

N-(O,O - diethylphosphorothiono) - N',N' - di-(β-hydroxyethyl) thiourea; percent yield=94.0; found: 9.5% P and 18.8% S; theory: 9.8% P and 20.2% S.

Example 10

$(CH_3O)_2P(S)$—NHC(S)—N(CH$_2$CH$_2$OH)$_2$

N - (O,O - dimethylphosphorothiono)-N',N'-di-(β-hydroxyethyl) thiourea; $N_D^{25}$=1.5398; percent yield=86.0; found: 10.5% P and 22.5% S; theory: 10.7% P and 22.2% S.

Example 11

$(CH_3O)_2P(S)$—NHC(S)—NHCH$_2$CH$_2$OH

N - (O,O - dimethylphosphorothiono)-N'-(hydroxyethyl) thiourea; percent yield=94.0; found: 12.5% P and 24.7% S; theory: 12.7% P and 25.2% S.

Example 12

$(C_2H_5O)_2P(O)$—NHC(S)—N(CH$_3$)(C$_2$H$_4$OH)

N - (O,O - diethylphosphoryl) - N' - (methyl)-N'-hydroxyethyl) thiourea; $N_D^{25}$=1.5045; percent yield=97.0; found: 11.3% P and 12.1% S; theory: 11.5% P and 11.9% S.

Example 13

$(C_2H_5O)_2P(S)$—NHC(S)—N(CH$_3$)(C$_2$H$_4$OH)

N-(O,O - diethylphosphorothiono) - N' - (methyl)-N'-(hydroxyethyl) thiourea; percent yield=91.0; found: 10.9% P and 20.7% S; theory: 10.9% P and 22.4% S.

Example 14

$(CH_3O)_2P(S)$—NHC(S)—N(CH$_3$)(C$_2$H$_4$OH)

N - (O,O - dimethylphosphorothiono) - N' - (methyl)-N' - (hydroxyethyl) thiourea; $N_D^{25}$=1.5541; percent yield=97.5; found: 10.8% P and 24.3% S; theory: 12.0% P and 24.8% S.

Example 15

$(C_2H_5O)_2P(O)-NHC(S)-N(C_3H_7-i)(C_2H_4OH)$

N-(O,O-diethylphosphoryl) - N' - (isopropyl)-N'-(hydroxyethyl) thiourea; $N_D^{25}=1.5055$; percent yield=92.5; found: 10.2% P and 9.9% S; theory: 10.4% P and 10.7% S.

Example 16

$(CH_3O)_2P(S)-NHC(S)-N(C_3H_7-i)(C_2H_4OH)$

N-(O,O-dimethylphosphorothiono) - N' - (isopropyl)-N' - (hydroxyethyl) thiourea; $N_D^{25}=1.5439$; percent yield=91.0; found: 10.2% P and 21.3% S; theory: 10.7% P and 22.0% S.

Example 17

$(CH_3O)_2P(S)-NHC(S)-N(C_8H_{17})(C_2H_4OH)$

N-(O,O - dimethylphosphorothiono) - N' - (octyl)-N'-(hydroxyethyl) thiourea; percent yield=82.3; found: 8.8% P and 16.1% S; theory: 8.8% P and 17.9% S.

Example 18

$(C_2H_5O)_2P(O)-NHC(S)-N(C_8H_{17})(C_2H_4OH)$

N-(O,O - diethylphosphoryl)-N'-(octyl)-N'-(hydroxymethyl) thiourea; $N_D^{25}=1.4731$; percent yield=94.6; found: 8.9% P and 7.7% S; theory: 8.5% P and 8.7% S.

Example 19

$(C_2H_5O)_2P(O)-NHC(S)-N(C_6H_5)(CH_2CH_2OH)$

N - (O,O - diethylphosphoryl) - N' - (phenyl)-N'-(hydroxyethyl) thiourea; $N_D^{25}=1.5647$; percent yield=97.0; found: 10.4% P; theory: 10.7% P.

Example 20

$(C_2H_5O)_2P(S)-NHC(S)-N(C_6H_5)(C_2H_4OH)$

N-(O,O - diethylphosphorothiono) - N' - (phenyl)-N'-(hydroxyethyl) thiourea; percent yield=97.5; found: 9.0% P and 16.1% S; theory: 8.9% P and 18.3% S.

Example 21

$(CH_3O)_2P(S)-NHC(S)-N(C_6H_5)(C_2H_4OH)$

N - (O,O - dimethylphosphorothiono)-N'-(phenyl)-N'-(hydroxyethyl) thiourea; percent yield=98.0; found: 10.3% P and 18.6% S; theory: 9.7% P and 19.9% S.

Example 22

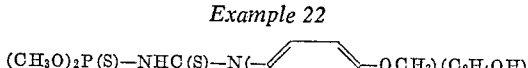

N - (O,O - dimethylphosphorothiono) - N' - (p-chlorophenyl)-N'-(hydroxyethyl) thiourea; percent yield=97.6; found: 8.7% P and 16.9% S; theory: 8.9% P and 18.2% S.

Example 23

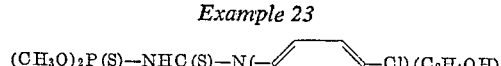

N-(O,O - dimethylphosphorothiono) - N' - (p-chlorophenyl)-N'-(hydroxyethyl) thiourea; percent yield=95.6; found: 9.0% P and 18.3% S; theory: 8.8% P and 18.0% S.

Example 24

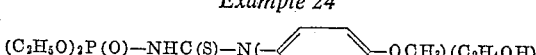

N-(O,O-diethylphosphoryl) - N' - (hydroxyethyl)-N'-(p-methoxyphenyl) thiourea; percent yield=91.0; found: 8.2% P and 8.2% S; theory: 8.2% P and 8.4% S.

Example 25

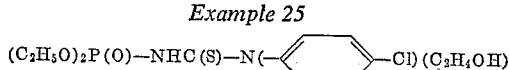

N-(O,O - diethylphosphoryl) - N' - (hydroxyethyl)-N'-(p-chlorophenyl) thiourea; percent yield=89.0; found: 8.3% P and 8.1% S; theory: 8.4% P and 8.6% S.

Example 26

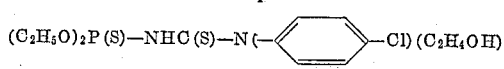

N - (O,O - diethylphosphorothiono)-N'-(p-chlorophenyl)-N'-(hydroxyethyl) thiourea; percent yield=96.0; found: 8.1% P and 15.9% S; theory: 8.2% P and 16.7% S.

Example 27

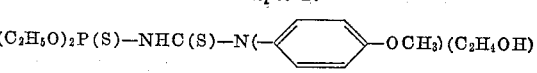

N-(O,O-diethylphosphorothiono) - N' - (hydroxyethyl)-N'-(p-methoxyphenyl) thiourea; percent yield=94.0; found: 8.1% P and 16.7% S; theory: 8.2% P and 16.9% S.

Example 28

$(C_2H_5O)_2P(S)-NHC(S)-N(C_8H_{17})(C_2H_4OH)$

N-(O,O'-diethylphosphorothiono) - N' - (octyl) - N'- (hydroxyethyl) thiourea; percent yield=94.0; found: 8.1% P and 15.1% S; theory: 8.2% P and 16.6% S.

Example 29

$(C_2H_5O)_2P(O)-NHC(S)-N(C_2H_5)(CH_2CHOHCH_3)$

N-(O,O-diethylphosphoryl)-N'-(ethyl) - N' - (2 - hydroxypropyl-1) thiourea; percent yield=97.4; found: 10.6% P and 9.7% S; theory: 10.4% P and 10.7% S.

Example 30

$(C_2H_5O)_2P(S)-NHC(S)-N(C_2H_5)(CH_2CHOHCH_3)$

N-(O,O-diethylphosphorothiono) - N' - (ethyl) - N'- (2 - hydroxypropyl - 1) thiourea; percent yield=94.5; found: 8.9% P and 18.4% S; theory: 9.8% P and 20.2% S.

Example 31

$(CH_3O)_2P(S)-NHC(S)-N(C_2H_5)(CH_2CHOHCH_3)$

N-(O,O-dimethylphosphorothiono) - N' - (ethyl)-N'- (2-hydroxypropyl-1) thiourea; percent yield=100.0; found: 10.5% P and 22.1% S; theory: 10.8% P and 22.3% S.

Example 32

$(C_2H_5O)_2P(S)-NHC(S)-N(CH_3)(CH_2CHOHCH_3)$

N-(O,O-diethylphosphorothiono) - N' - (methyl)-N'- (2 - hydroxypropyl - 1) thiourea; percent yield=98.5; found: 10.4% P and 20.4% S; theory: 10.3% P and 21.2% S.

Example 33

$(C_2H_5O)_2P(S)-NHC(S)$
$-N(C_2H_5)[CH_2CH(OH)(C_6H_5)]$

N-(O,O-diethylphosphorothiono)-N'-(ethyl) - N' - (2-hydroxy-2-phenyl ethyl) thiourea; percent yield=100.0; found: 8.1% P and 16.9% S; theory: 8.2% P and 17.0% S.

Example 34

$(CH_3O)_2P(S)-NHC(S)$
$-N(C_2H_5)[CH_2CH(C_6H_5)OH]$

N - (O,O-dimethylphosphorothiono)-N'-(ethyl)-N'-(2-hydroxy - 2 - phenyl) thiourea; percent yield=100.0; found: 9.5% P and 17.9% S; theory: 8.9% P and 18.3% S.

Example 35

$(CH_3O)_2P(S)-NHC(S)-N(CH_3)(CH_2CHOHCH_3)$

N-(O,O-dimethylphosphorothiono) - N' - (methyl)-N- (2 - hydroxypropyl - 1) thiourea; percent yield=97.6; found: 11.6% P and 22.6% S; theory: 11.4% P and 23.5% S.

Example 36

$(C_2H_5O)_2P(S)$—NH—C(S)
—$N(C_2H_5)(CH_2CHOH$—$C_2H_5)$

N-(O,O-diethylphosphorothiono)-N'-(ethyl) - N' - (2-hydroxybutyl-1) thiourea; percent yield=93.2; found: 9.0% P and 19.0% S; theory: 9.8% P and 20.3% S.

Example 37

$(C_2H_5O)_2P(O)$—NH—C(S)
—$N(CH_3)(CH_2CHOH$—$C_2H_5)$

N-(O,O-diethylphosphoryl)-N'-(methyl) - N' - (2-hydroxybutyl-1) thiourea; percent yield=98.5; found: 10.8% P and 10.5% S; theory: 10.3% P and 10.6% S.

Insecticidal activity for the compounds of the foregoing examples is illustrated in Table II wherein the percentage kill among the pest species is reported for a specified quantity of candidate compound expressed in micrograms (herein termed the bioassay test) or for a percentage concentration of the compound in aqueous dispersion (herein termed the screening test). A slanted line is used to separate the percentage kill from the test species shown on the left and the percentage concentration or total quantity, shown on the right.

TABLE II

*Mortality of Representative Species of Common Insect Orders*

| Compound (Example Number) | M. domestica | P. americana | O. fasciatus | M. pisi |
|---|---|---|---|---|
| | | Percent | Percent | Percent |
| 4 | 72/50µg | 0/0.1 | 100/0.05 | 100/0.01 |
| 9 | 68/0.1% | 0/0.1 | 0/0.1 | |
| 14 | 100/0.1% | 80/0.1 | 70/0.05 | |
| 17 | 100/0.1% | 60/0.1 | 90/0.1 | |
| 17 | 96/0.1% | 20/0.1 | 0/0.1 | |

In the screening tests for the insect species of Table II, from ten to twenty-five insects were caged in cardboard mailing tubes 3⅛" in diameter and 2⅝" tall. The cages were supplied with cellophane bottoms and screen tops. Food and water were supplied to each cage. Dispersions of the test compounds were prepared by dissolving one half gram of the toxic material in 10 ml. of acetone. This solution was then diluted with water containing 0.015% Vatsol (a sulfonate-type wetting agent) and 0.005% Methocel (methyl cellulose) as emulsifiers, the amount of water being sufficient to dilute the active ingredients to a concentration of 0.1% or below. The test insects were then sprayed with this dispersion. After twenty-four and seventy-two hours, counts were made to determine living and dead insects.

Some of the compounds which showed high mortality on house flies in the screening test were bioassayed on *M. domestica*. In this test, a known quantity of the toxicant was placed in a confined area. The same cages were employed as for the fly screening test. A weighed amount of the toxicant was placed in a 60 mm. diameter Petri dish along with 1 ml. of acetone containing light spray oil. After the solution air-dried, a cage containing twenty-five female flies was placed over the residue. Counts of living and dead insects were made after twenty-four and seventy-two hours.

It has been further found that the compounds of the present invention are excellent systemic miticides. In testing for systemic action, pinto bean plants were placed in bottles containing 200 ml. of the test solution and were held in place with cotton plugs. Only the roots were immersed. The solutions were prepared by dissolving the candidate miticide in acetone or other suitable solvent and then diluting with distilled water. The final acetone concentration of the solution was never allowed to exceed 1% and the toxicant was initially tested at a concentration of 100 p.p.m. As soon as the plants were placed in the solution they were infested with mites. Mortalities of both embryonic and post-embryonic forms were determined fourteen days after initiation of the test. By this test, post-embryonic mortalities of 100% have been found at concentrations of 10 p.p.m of the test compound, for the compounds of Examples 10, 14, and 16 shown above. Embryonic mortality has been also determined to be rather high.

Although the above tests were accomplished with aqueous dispersions, the toxic compounds can also be used commercially in the form of aqueous solutions, when appreciably soluble- non-aqueous solutions, wettable powders, vapors, and dusts as best suited to the conditions of use. In many applications fillers will be incorporated with the toxic compounds. For more specialized application, the material may even be used in its pure, undiluted form.

Where used herein the term "pest" is intended in the restricted sense generally recognized in the art as applying to the lower forms of life customarily controlled by chemical means and excluding the higher animals, the vertabrates, for example, rodents, birds, and larger forms which are more commonly controlled by mechanical means such as traps. It will be apparent to one skilled in the art that the toxic activity demonstrated hereinbefore on various test species is indicative of activity with species and orders not specifically shown.

The foregoing description is given for clearness of understanding only and no unnecessary limitations should be understood therefrom, as modifications will be obvious to those skilled in the art.

We claim:

1. A compound having the formula:

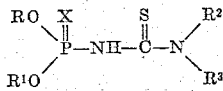

wherein R and $R^1$ are lower-alkyl, X is selected from the group consisting of sulfur and oxygen, $R^2$ is selected from the group consisting of lower hydroxyalkyl and phenyl-substituted lower hydroxyalkyl radicals, and $R^3$ is selected from the group consisting of hydrogen, lower-alkyl, aryl, and $R^2$ as previously defined.

2. N - (O,O - diethylphosphorothiono) - N' - (phenyl)-N'-(hydroxyethyl) thiourea.

3. N-(O,O-dimethylphosphorothiono)-N'-(octyl) - N'-(hydroxyethyl) thiourea.

4. N-(O,O-dimethylphosphorothiono) - N' - (ethyl-N'-(β-hydroxyethyl) thiourea.

5. N-(O,O-dimethylphosphorothiono) - N',N'-di(β-hydroxyethyl) thiourea.

6. A method of controlling pests which comprises contacting said pests with a pesticidal amount of at least one compound having the formula:

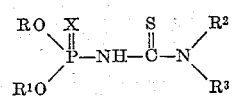

wherein R and $R^1$ are lower-alkyl, X is selected from the group consisting of sulfur and oxygen, $R^2$ is selected from the group consisting of lower hydroxyalkyl and phenyl-substituted lower hydroxyalkyl radicals, and $R^3$ is selected from the group consisting of hydrogen, lower-alkyl, aryl, and $R^2$ as previously defined.

7. A method of controlling pests which comprises contacting said pests with a pesticidal amount of N-(O,O-dimethylphosphorothiono) - N' - (ethyl) - N' - (β-hydroxyethyl) thiourea.

8. A method of controlling pests which comprises contacting said pests with a pesticidal amount of N-(O,O-dimethylphosphorothiono)-N'-(methyl) - N' - (β-hydroxyethyl) thiourea.

9. A method of controlling pests which comprises contacting said pests with a pesticidal amount of N-(O,O-dimethylphosphorothiono)-N'-(isopropyl-N'-(β - hydroxyethyl) thiourea.

10. A method of controlling pests which comprises contacting said pests with a pesticidal amount of N-(O,O-dimethylphosphorothiono) - N' - (octyl) - N' - (β-hydroxyethyl) thiourea.

References Cited in the file of this patent

FOREIGN PATENTS 952,712    Germany _____ Nov. 22, 1956

OTHER REFERENCES

Michalski et al.: "Roczniki Chem.," vol. 31, 1957, pp. 1–19.

Levchenko et al.: "Zhurnal Obsche. Khimii," vol. 29, No. 4, 1959, pp. 1249–1254.